UNITED STATES PATENT OFFICE.

THOMAS A. EDISON, OF LLEWELLYN PARK, NEW JERSEY, ASSIGNOR TO EDISON STORAGE BATTERY COMPANY, A CORPORATION OF NEW JERSEY.

REVERSIBLE GALVANIC BATTERY.

SPECIFICATION forming part of Letters Patent No. 704,304, dated July 8, 1902.

Application filed March 1, 1901. Serial No. 49,452. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,055,) of which the following is a description.

My present invention relates to improvements in reversible galvanic batteries.

In an application for Letters Patent filed June 20, 1901, Serial No. 65,285, I describe an improved reversible galvanic battery employing an alkaline electrolyte and wherein the oxygen-furnishing material or depolarizer is an oxid of nickel or cobalt, the oxidizable element of the battery being insoluble in the electrolyte and being capable of alternate electrolytic oxidation and reduction. In said application I mention as suitable oxidizable materials electrolytically-active finely-divided iron, as described and claimed in my Patent No. 678,722, dated July 16, 1901, metallic cadmium or oxid of cadmium, as I describe in my application for Letters Patent filed October 31, 1900, Serial No. 34,994, and metallic copper or oxid of copper, as I describe in my application for Letters Patent filed June 20, 1901, Serial No. 65,288. By claiming the oxid of a specific magnetic metal other than iron in said application Serial No. 65,285 I have generically included the utilizable oxids of both nickel and cobalt, and I have also specifically claimed therein oxid of nickel as the preferable oxid on account of its greater cheapness at the present time.

My purpose in the present application is to describe and specifically claim oxid of cobalt as a depolarizer used in an alkaline reversible galvanic battery with any suitable oxidizable material.

My present invention then resides in the discovery that the lower oxids of cobalt when in contact with a conductor in an alkaline solution can be almost wholly raised from the lower to a higher stage of oxidation electrolytically and that these higher oxids revert to a lower stage by reduction with extreme ease, and I am thereby enabled to construct an oxygen-storing element which in capacity, weight, and permanence is practically identical with the oxid of nickel and superior in these respects to any other electrode for the purpose, so far as I know, suggested or applied before my invention.

The preferred process of making the oxygen-storing element consists in first precipitating the monoxid or black hydrated dioxid of cobalt in the usual way, washing the precipitate free from the products of the reaction, filtering off the liquid, and drying the precipitate. The resulting dried hydrated oxid is then powdered very fine and is ready for use. About seven parts, by weight, of the finely-powdered hydrate and three parts, by weight, of flake-graphite are then intimately mixed and moistened with a small quantity of a strong solution of potassic hydroxid, so as to dampen the mass, which is then properly carried in or by a suitable support made of some metal not affected by the solution, as nickel or carefully nickel-plated iron or steel. The electrodes are then immersed in a solution of potassic hydroxid in water and subjected for a considerable time to an oxidizing-current of about fifty milamperes per square inch of surface, during which the oxid is either raised to a higher stage of oxidation than the dioxid $Co_2O_3$ or else acts as an absorber of oxygen in some manner unknown to me. Whatever the action may be, the oxid so treated acts as a most efficient oxygen-storing element for commercial use in a galvanic battery.

The object of employing graphite, which is not affected by electrolytic oxidation, is to offer a great extent of surface against which the whole of the oxid is in contact, a large conducting-surface being necessary, since the electrolytic reduction and oxidation for practical purposes only extend a small distance from the conducting-surface against which the oxid is in contact. This is admirably effected by the use of graphite in its micaceous or foliated form, the proportions indicated being such as to practically insure that the electrolytic action need not penetrate a greater distance from the contact-surface than the thickness of a single particle of the powdered oxid. Furthermore, there is no local action between the oxid of cobalt and the graphite.

My improved oxygen-furnishing element when charged electrolytically to raise the oxid to a higher state of oxidation or to absorb oxygen in its physical pores or otherwise is used in an alkaline solution as the depolarizer with any convenient or desirable oxidizing element—for example, finely-divided-electrolytically-reducible iron, as I describe in my Patent No. 678,722, before referred to, or finely-divided cadmium, as I describe in my pending application, filed October 31, 1900, Serial No. 34,994. When employed with finely-divided iron, for instance, the electrolyte may be a twenty-five-per-cent. solution of potassic hydroxid in water, the iron being in metallic form and the cobalt oxid being raised to its higher stage. On discharging, the cobalt oxid will revert to a lower state of oxidation, and the iron will be converted to ferrous oxid.

Having now described my invention, what I claim is—

1. An active element for an alkaline reversible galvanic battery, comprising a conducting-support and a mixture of oxid of cobalt and an inert flake-like conducting material carried thereby, substantially as set forth.

2. An active element for an alkaline reversible galvanic battery, comprising a conducting-support and a mixture of an oxid of cobalt containing more oxygen than the black oxid ($Co_2O_3$) and a flake-like inert conducting material carried thereby, substantially as set forth.

3. An active element for an alkaline reversible galvanic battery, comprising a conducting-support and a mixture of a hydrated oxid of cobalt and an inert flake-like conducting material carried thereby, substantially as set forth.

4. An active element for an alkaline reversible galvanic battery, comprising a conducting-support, and a mixture of flake-graphite and oxid of cobalt carried thereby, substantially as set forth.

5. In a reversible galvanic battery, an alkaline electrolyte, a conducting-support carrying finely-divided electrolytically-active iron when charged, and a conducting-support carrying an oxid of cobalt capable of furnishing oxygen on discharge, substantially as set forth.

6. In a reversible galvanic battery, an alkaline electrolyte, a conducting-support carrying finely-divided iron when charged, and a conducting-support carrying a mixture of flake-graphite and oxid of cobalt capable of furnishing oxygen on discharge, substantially as set forth.

7. In a reversible galvanic battery, the combination of an electrolyte which remains unchanged during all conditions of working, and two elements therein insoluble in such electrolyte, the depolarizing element having for its active material an electrolytically-active oxid of cobalt, substantially as set forth.

8. In a reversible galvanic battery, the combination of an alkaline electrolyte which remains unchanged during all conditions of working, a conducting-support therein, an insoluble oxidizable material carried by said support, a second conducting-support, and an oxid of cobalt carried thereby having more oxygen than $Co_2O_3$, substantially as set forth.

9. In a reversible galvanic battery, the combination of an alkaline electrolyte which remains unchanged during all conditions of working, a conducting-support therein, an insoluble oxidizable material carried by said support, a second conducting-support, an oxid of cobalt carried thereby having more oxygen than $Co_2O_3$, and an inert conducting material intimately mixed with said oxid, substantially as set forth.

10. In a reversible galvanic battery, the combination of an alkaline electrolyte which remains unchanged during all conditions of working, a conducting-support therein, an insoluble oxidizable material carried by said support, a second conducting-support, an oxid of cobalt carried thereby having more oxygen than $Co_2O_3$, and an inert flake-like conducting material intimately mixed with said oxid, substantially as set forth.

11. In a reversible galvanic battery, the combination of an alkaline electrolyte which remains unchanged during all conditions of working, a conducting-support therein, an insoluble oxidizable material carried by said support, a second conducting-support, an oxid of cobalt carried thereby having more oxygen than $Co_2O_3$, and flake-graphite intimately mixed with said oxid, substantially as set forth.

12. In a reversible galvanic battery, the combination of an alkaline electrolyte which remains unchanged during all conditions of working, a conducting-support therein, an insoluble oxidizable material carried by said support, a second conducting-support, a hydrated oxid of cobalt carried thereby, and a flake-like inert conducting material intimately mixed with said oxid, substantially as set forth.

13. In a reversible galvanic battery, the combination of an alkaline electrolyte which remains unchanged during all conditions of working, a conducting-support therein, an insoluble oxidizable material carried by said support, a second conducting-support, a hydrated oxid of cobalt carried thereby, and flake-graphite intimately mixed with said oxid, substantially as set forth.

14. In a reversible galvanic battery, an alkaline electrolyte, a conducting-support carrying finely-divided iron when charged, and another conducting-support carrying oxid of cobalt having when charged electrolytically more oxygen than $Co_2O_3$, substantially as set forth.

15. In a reversible galvanic battery, an alkaline electrolyte, a conducting-support carrying finely-divided iron when charged, and another conducting-support carrying a hydrated oxid of cobalt, substantially as set forth.

16. In a reversible galvanic battery, an alkaline electrolyte, a conducting-support carrying finely-divided iron when charged, another conducting-support carrying oxid of cobalt capable of furnishing oxygen for the oxidation of the iron on discharge, and flake-graphite intimately mixed with said oxid, substantially as set forth.

17. In a reversible galvanic battery, an alkaline electrolyte, a conducting-support carrying finely-divided oxid of iron when discharged, another conducting-support carrying an oxid of cobalt, and flake-graphite intimately mixed with said oxid, substantially as set forth.

18. In a reversible galvanic battery, an alkaline electrolyte, a conducting-support carrying finely-divided iron when charged, another conducting-support carrying oxid of cobalt having when charged electrolytically more oxygen than $Co_2O_3$, and flake-graphite intimately mixed with said oxid, substantially as set forth.

19. In a reversible galvanic battery, an alkaline electrolyte, a conducting-support carrying finely-divided iron when charged, another conducting-support carrying a hydrated oxid of cobalt, and flake-graphite intimately mixed with said oxid, substantially as set forth.

This specification signed and witnessed this 23d day of February, 1901.

THOS. A. EDISON.

Witnesses:
FRANK L. DYER,
JNO. R. TAYLOR.